US008904482B1

(12) United States Patent
Dotan et al.

(10) Patent No.: US 8,904,482 B1
(45) Date of Patent: Dec. 2, 2014

(54) TECHNIQUES FOR SECURING A ONE-TIME PASSCODE WITH AN ALTERATION CODE

(71) Applicant: EMC Corporation, Hopkinton, MA (US)

(72) Inventors: Yedidya Dotan, Newton, MA (US); Marco Ciaffi, Sudbury, MA (US); Lawrence N. Friedman, Arlington, MA (US); Igor Shmukler, Boxborough, MA (US); John Gordon Brainard, Sudbury, MA (US)

(73) Assignee: EMC Corporation, Hopkinton, MA (US)

( * ) Notice: Subject to any disclaimer, the term of this patent is extended or adjusted under 35 U.S.C. 154(b) by 0 days.

(21) Appl. No.: 13/731,443

(22) Filed: Dec. 31, 2012

(51) Int. Cl.
*H04L 9/32* (2006.01)
*G06F 21/34* (2013.01)

(52) U.S. Cl.
CPC ..................................... *G06F 21/34* (2013.01)
USPC ............................ 726/2; 726/3; 726/4; 726/9

(58) Field of Classification Search
CPC ......... H04L 9/08; H04L 9/22; H04L 63/0846; G07F 7/1008; G07F 7/1016; G07F 21/31; G07F 21/32; G07F 21/34; G07F 21/44
USPC ...................... 380/44, 46; 713/172, 182–186; 726/2–9, 20–21
See application file for complete search history.

(56) References Cited

U.S. PATENT DOCUMENTS

| 6,430,170 | B1 * | 8/2002 | Saints et al. ................... 370/335 |
| 7,233,664 | B2 * | 6/2007 | Soliman .......................... 380/44 |
| 8,006,300 | B2 | 8/2011 | Mizrah |
| 2007/0234064 | A1 * | 10/2007 | Nihei ............................. 713/183 |
| 2009/0287922 | A1 * | 11/2009 | Herwono et al. ............. 713/155 |
| 2010/0186074 | A1 | 7/2010 | Stavrou et al. |
| 2012/0047071 | A1 * | 2/2012 | Mullen et al. ................... 705/44 |

\* cited by examiner

*Primary Examiner* — Hosuk Song
(74) *Attorney, Agent, or Firm* — BainwoodHuang

(57) ABSTRACT

A token apparatus is described, including (a) a controller, the controller being configured to generate an OTP in synchronization with a remote authentication server, (b) a display, the display being constructed and arranged to display the OTP, and (c) an input apparatus, the input apparatus being constructed and arranged to receive a user-input alteration code, the user-input alteration code being used to alter the OTP in a standardized manner. A method of operating a token device which displays an OTP in synchronization with a remote authentication server is described, including (a) receiving an alteration code, (b) entering the alteration code onto the token device, and (c) causing an altered OTP to be entered into an application that seeks to authenticate a user, the altered OTP having been generated from the OTP in a standardized manner based on the alteration code. An authentication system is also described.

25 Claims, 10 Drawing Sheets

TECHNIQUES FOR SECURING A ONE-TIME PASSCODE WITH AN ALTERATION CODE

BACKGROUND

Interactions between users and institutions sometimes require a high degree of security. An example interaction is a banking transaction. Often, an institution provides tokens to its clients to allow the clients to securely log in to a remote service provided by the institution. The token is a physical device which allows the institution to verify the identity of the client. Each token is typically configured to provide one-time passcodes (OTPs) generated using a secret seed, the seeds only being stored on that token and on an authentication server for the remote service. The client is then able to present the OTP generated by the token to an agent of the authentication server as proof of identity.

SUMMARY

In the conventional approach, if an attacker is able to illicitly acquire seeds from an authentication server, the attacker may engage in a rainbow attack in which he associates the seeds with particular clients by sniffing the OTPs produced by a particular token in authentication requests and determining which of the seeds was used to generate those OTPs. The attacker may then replicate the token's functionality and use the user's credentials to log in to the system.

It would be desirable to provide tokens which are resistant to sniffing attacks by attackers who have been able to illicitly acquire seed values. Thus, techniques are presented for providing temporary alteration codes to users at authentication time which can be used to obscure OTPs provided by tokens, making it more difficult for an attack to succeed.

One embodiment is directed to a token apparatus. The token apparatus includes (a) a controller configured to generate an OTP in synchronization with a remote authentication server, (b) a display constructed and arranged to display the OTP, and (c) an input apparatus constructed and arranged to receive a user-input alteration code, the user-input alteration code being used to alter the OTP in a standardized manner.

Another embodiment is directed to a method of operating a token device that displays an OTP in synchronization with a remote authentication server. The method includes (a) receiving an alteration code, (b) entering the alteration code onto the token device, and (c) causing an altered OTP to be entered into an application that seeks to authenticate a user, the altered OTP having been generated from the OTP in a standardized manner based on the alteration code.

Another embodiment is directed to an authentication system. The authentication system includes (a) an authentication server, the authentication server storing a set of secret seeds, each secret seed being associated with a distinct token device, (b) an authentication agent for authenticating an identity of a user assigned to possess a particular token device having a particular secret seed, and (c) an alteration server, separate from the authentication server, the alteration server being configured to generate an alteration code for a particular authentication transaction. The authentication agent is configured to (1) receive an authentication request from the user, the authentication request including an altered OTP, (2) obtain the particular seed associated with the particular token device assigned to the user, (3) obtain the alteration code for the particular authentication transaction involving the received authentication request, and (4) verify that the altered OTP from the received authentication request is the result of applying the alteration code to alter an OTP in a standardized manner, the OTP having been generated by the particular token device using the particular seed in synchronization with the authentication server.

Other embodiments are directed to a computerized apparatus and computer program product. Some embodiments involve activity that is performed at a single location, while other embodiments involve activity that is distributed over a computerized environment (e.g., over a network).

BRIEF DESCRIPTION OF THE DRAWINGS

The foregoing and other objects, features and advantages will be apparent from the following description of particular embodiments of the present disclosure, as illustrated in the accompanying drawings in which like reference characters refer to the same parts throughout the different views. The drawings are not necessarily to scale, emphasis instead being placed upon illustrating the principles of various embodiments of the present disclosure.

DETAILED DESCRIPTION

Embodiments of the invention are directed to techniques for providing temporary alteration codes to users at authentication time that can be used to obscure OTPs provided by tokens.

Figure 1:
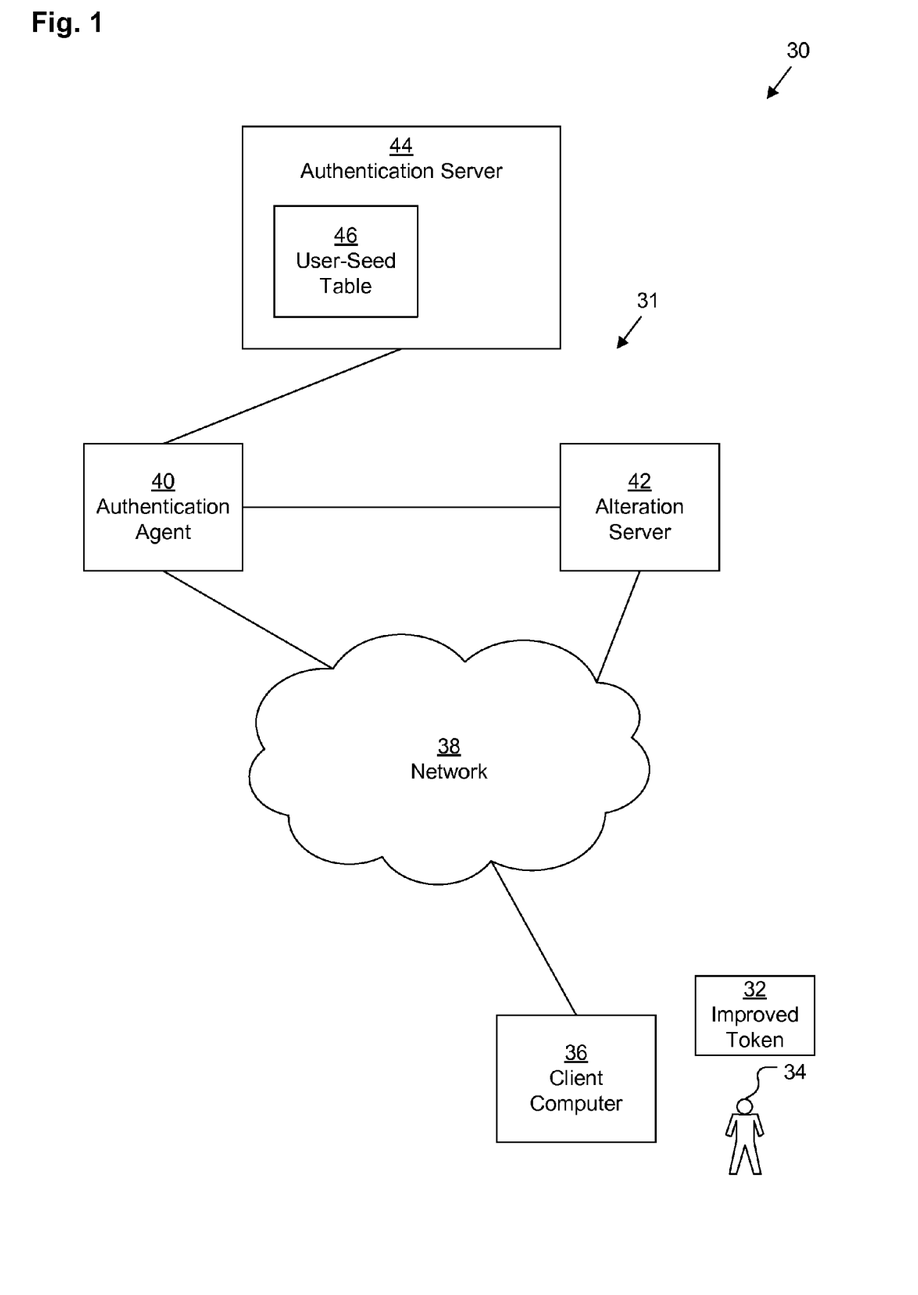
FIG. 1 is a block diagram depicting an example environment in which various embodiments may be practiced.

FIG. 1 depicts an example environment 30 for use in performing various embodiments. Environment 30 includes an authentication system 31 connected to a client computer 36 via a network 38. The client computer 36 is operated by a user 34 in possession of an improved token 32. User 34 is attempting to gain access to a protected resource (not depicted) by authenticating to the authentication system 31 via network 38 using the improved token 32.

Network 38 may be any kind of network, such as, for example, a local area network, a wide area network, the Internet, a storage area network, a fabric of interconnected hubs and switches, etc. In some embodiments, in lieu of a network, direct point-to-point connections may be used.

Authentication system 31 includes an authentication agent 40, an alteration server 42, and an authentication server 44. The authentication agent 40 is an application or other software construct with which the client computer 36 engages to perform the authentication. The user 34 operates improved token 32 to generate an OTP based on a secret seed stored securely on the improved token. The secret seed is also stored in a user-seed table 46 on the authentication server 44. Thus, both the improved token 32 and the authentication server 44

(or, in some embodiments, the authentication agent 40, if the authentication server 44 sends the appropriate seed for that user 34 to the authentication agent 40) are able to generate the same OTP by cryptographically combining the seed and other information known to both (e.g., the current time).

Authentication server 44 may be any kind of computing device, such as, for example, a personal computer, a workstation, a server, an enterprise server, a laptop computer, a mobile computer, a smart phone, a tablet computer, etc., however, authentication server 44 will typically be a server or enterprise server.

In some embodiments, authentication agent 40 runs as an application on the authentication server 44, while in, other embodiments, authentication agent 40 runs on a separate computing device.

Alteration server 42 may be any kind of computing device, such as, for example, a personal computer, a workstation, a server, an enterprise server, a laptop computer, a mobile computer, a smart phone, a tablet computer, etc., however, alteration server 42 will typically be a server or enterprise server. Alteration server 42 generates alteration codes (to be described in further detail below, throughout this document), which it sends to client computer 36 for user 34 to input into the improved token 32. The alteration code allows the user 34 to input an altered OTP into client computer 36 so that the OTP may be transferred across network 38 in altered form, making it difficult for an attacker to obtain the OTP for conducting a rainbow attack. Alteration server 42 also sends the alteration codes to authentication agent 40, so that the authentication agent 40 may determine whether the client computer 36 attempted to authenticate using the proper OTP altered using the proper alteration code.

In some embodiments, authentication agent 40 runs as an application on the alteration server 42. However, alteration server 42 preferably is a separate machine from authentication server 44 in order to isolate the alteration codes from the seeds in the event of an attack.

Client computer 36 may be any kind of computing device, such as, for example, a personal computer, a workstation, a server, an enterprise server, a laptop computer, a mobile computer, a smart phone, a tablet computer, etc., however, client computer 36 will typically be a personal computer, a laptop computer, a mobile computer, a smart phone, or a tablet computer.

Further detail with respect to the improved token 32 will now be provided, in connection with FIGS. 2-7.

Figure 2:
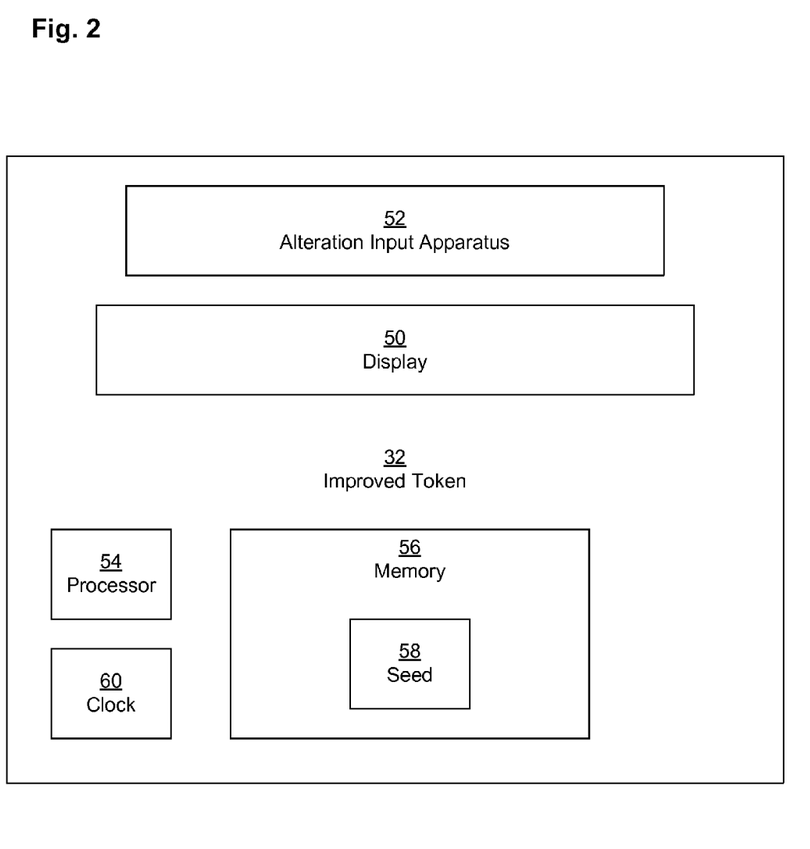
FIG. 2 is a block diagram depicting an example token device that may be included within the example environments of FIG. 1.

FIG. 2 depicts an example improved token 32 in further detail. Improved token 32 includes a display 50, an alteration input apparatus 52, a processor 54, memory 56, and a clock 60.

Display 50 is configured to display information to user 34. Display 50 may use any kind of display technology known now or in the future. Typically, however, display 50 is a low-voltage liquid crystal display configured to display a series of base-10 digits. For example, display 50 may be a rectangular liquid crystal display configured to display 6 digits or 8 characters in a linear pattern.

Alteration input apparatus 52 is configured to allow user 34 to enter or otherwise apply an alteration code received from alteration server 42. Further details of alteration input apparatus 52 are described below in connection with various embodiments depicted in FIGS. 3-7.

Processor 54 may be any kind of processor or set of processors configured to perform operations, such as, for example, a microprocessor, a multi-core microprocessor, a digital signal processor, a field-programmable gate array, an application-specific integrated circuit, a collection of electronic circuits, or any combination of the above. Since improved token 32 is typically a small, low-powered mobile device, processor 54 will typically take the form of a low-voltage specialized microprocessor.

Memory 56 may be any kind of digital memory, such as, for example, random access memory, read-only memory, static memory, volatile memory, non-volatile memory, system memory, solid-state storage, disk-based storage, or some combination of the above. Since improved token 32 is typically a small low-powered mobile device, memory 56 will typically take the form of low-voltage static memory or flash memory, used both for storage and program execution. Memory 56 stores a seed 58 for use in generating an OTP. In some embodiments, instead of storing a static seed, the previous OTP is used as a seed value, and the seed is dynamically updated as new OTPs are generated.

Clock 60 may be a basic digital clock circuit configured to produce different values at different times.

In some embodiments, processor 54 is configured to generate an OTP by cryptographically combining the seed 58 with a time value produced by the clock 60 using a chaotic function. In some embodiments, the OTP may be cryptographically generated from the seed 58 and other input information known to the authentication server 44, such as a counter value. The process of generating an OTP from a seed value is well-known in the art, and any well-known method may be used. Processor 54 may be configured either to generate the OTP upon receiving a command from the user 34 or to generate the OTP continuously every minute, or at some other periodicity. In some embodiments, processor 54 is also configured to display the generated OTP on the display 50.

In some embodiments, processor 54 is also configured to generate an altered OTP by applying the alteration code entered into the alteration input apparatus 52 to the generated OTP.

Figure 3:
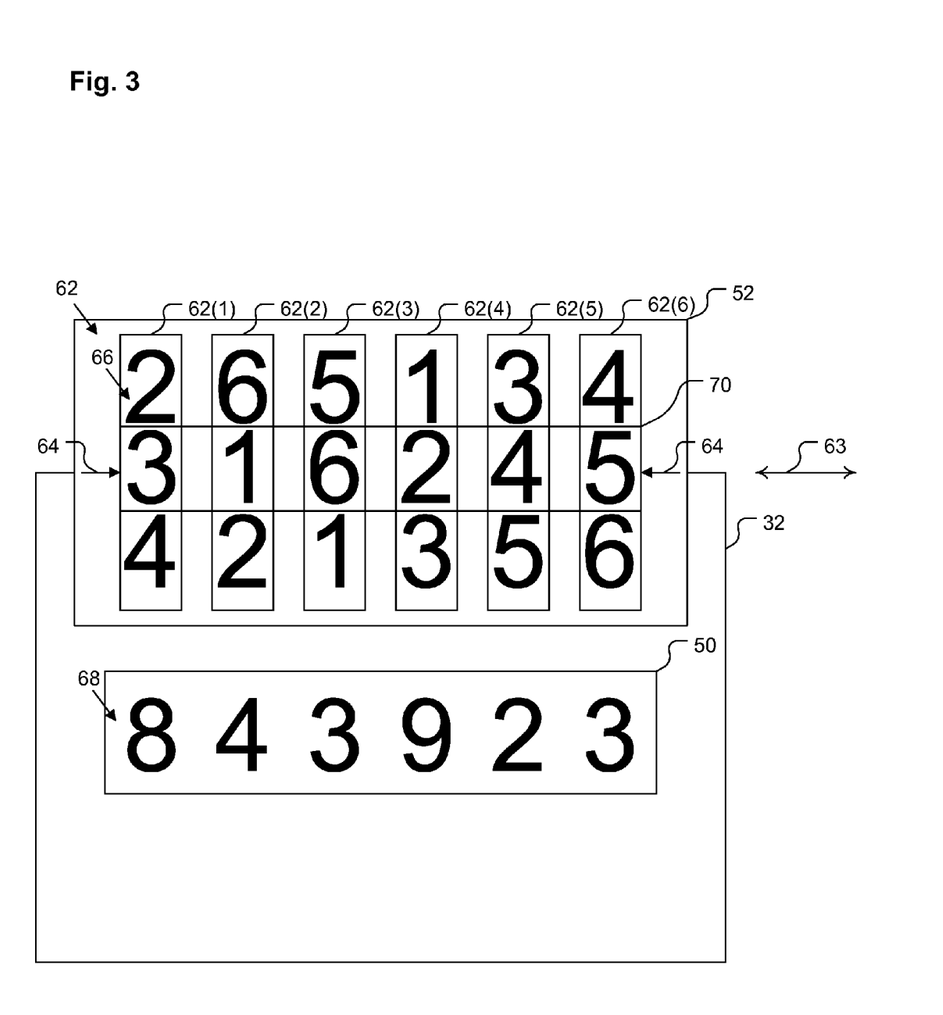
FIGS. 3, 4, 5B, 6, 7A, 7B, and 7C are block diagrams depicting token devices of various embodiments.

FIG. 3 depicts an example improved token 32 according to a particular embodiment. In this embodiment, alteration input apparatus 52 contains a set of rotatable rings 62 (depicted as six parallel rotatable rings 62(1), 62(2), . . . , 62(6)) which each rotate around one axis 63 of rotation parallel to a display direction of OTP 68 on display 50. Each rotatable ring 62 has numerals 66 imprinted thereon. The numerals 66 on each rotatable ring 62 typically vary from 1 to a maximum length of an OTP 68 displayable on the display 50. Thus, since OTP 68 contains six digits as depicted, each rotatable ring 62 contains the integers from 1 to 6 imprinted thereon.

An alignment indicator 64 indicates an entry position, which allows the user 34 to rotate each rotatable ring 62 until a particular numeral 66 is aligned with the alignment indicator 64, thereby forming a set of aligned numbers 70 making up the alteration code.

Upon entering the alteration code onto the set of rotatable rings 62, the set of aligned numbers 70 indicates to the user 34 how the OTP 68 should be modified to generate the altered OTP. Thus, as depicted in FIG. 3, the OTP is 843923 and the alteration code is 316245. The second digit of the alteration code, 1, indicates that the first digit of the altered OTP is the second digit of the OTP 68, which is 4. The fourth digit of the alteration code, 2, indicates that the fourth digit of the altered OTP is the second digit of the OTP 68, which is 9. The first digit of the alteration code, 3, indicates that the third digit of the altered OTP is the first digit of the OTP 68, which is 8. The fifth digit of the alteration code, 4, indicates that the fourth digit of the altered OTP is the fifth digit of the OTP 68, which is 2. The sixth digit of the alteration code, 5, indicates that the fifth digit of the altered OTP is the sixth digit of the OTP 68, which is 2. The third digit of the alteration code, 6, indicates that the sixth digit of the altered OTP is the third digit of the OTP 68, which is 3. Thus, taken together, the set of aligned numbers 70 indicates that the altered OTP is 498233.

Figure 4:
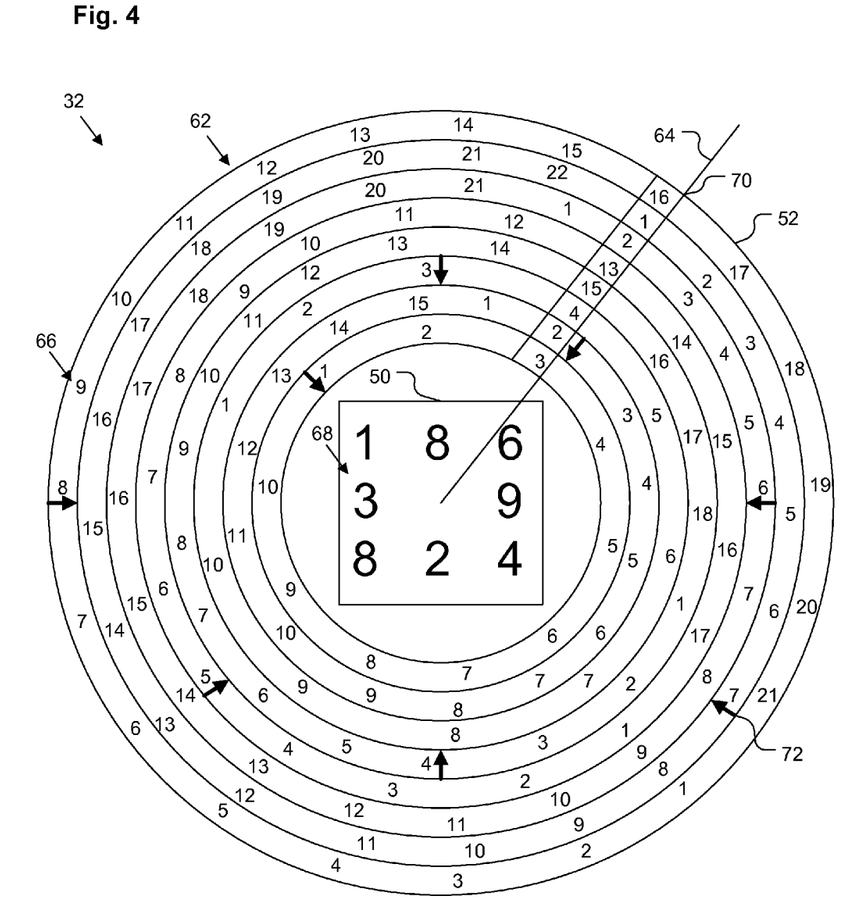

FIG. 4 depicts an example improved token 32 according to another particular embodiment. In this embodiment, alteration input apparatus 52 contains a set of rotatable rings 62 (depicted as eight concentric rotatable rings) which surround display 50. Display 50 may be a substantially square liquid crystal display configured to display eight digits of OTP 68 in a non-linear pattern. As depicted, display 50 displays the eight digits of OTP 68 along the perimeter of the square shape, with digits in each corner as well as at the center of each edge. Each rotatable ring 62 has numerals 66 imprinted thereon. The numerals 66 on each rotatable ring 62 may be arranged in various patterns, typically consecutive integers starting from 1. As depicted, each rotatable ring 62 has a different arrangement of numerals 66. For example, the innermost ring has the integers from 1 to 10 imprinted thereon, while the second ring from the center has the integers from 1 to 15 imprinted thereon, and the outermost ring has the integers from 1 to 21 imprinted thereon. In other embodiments (not depicted), each rotatable ring 62 may have the same number of numerals 66 imprinted thereon as all the other rotatable rings 62 (e.g., all rotatable rings may have the integers from 1 to 10). Each rotatable ring 62 also has an indicator arrow 72 imprinted thereon. As depicted, the indicator arrow 72 on each rotatable ring 62 is adjacent to a numeral 66 that indicates what number rotatable ring 62 counting out from the center that rotatable ring 62 is. Thus, the innermost rotatable ring 62 has its indicator arrow 72 adjacent to the numeral one, while the outermost rotatable ring 62 has its indicator arrow 72 adjacent to the numeral eight. This arrangement is by way of example only. In another arrangement (not depicted), the innermost rotatable ring 62 has its indicator arrow 72 adjacent to the numeral eight, while the outermost rotatable ring 62 has its indicator arrow 72 adjacent to the numeral one.

An alignment indicator 64 indicates an entry position, which allows the user 34 to rotate each rotatable ring 62 until a particular numeral 66 is aligned with the alignment indicator 64, thereby forming a set of aligned numbers 70 making up the alteration code. Upon entering the alteration code onto the set of rotatable rings 62, the indicator arrow 72 of each rotatable ring 62 points towards a different digit of the OTP on display 50. Because there are only eight digits in OTP on display 50 but each rotatable ring 50 has more than 8 numerals 66 imprinted thereon, some numerals 66 on each rotatable ring 62 may be considered illegal values to be entered next to alignment indicator 64, because in the resulting arrangement, the indicator arrow 72 for that rotatable ring 62 does not point to any identifiable digit of the OTP 68 on display 50. The indicator arrows 72 indicate the order of the digits of OTP 68 on display to be entered to create the altered OTP based on the numeral 66 adjacent to each indicator arrow 72.

Thus, as depicted in FIG. 4, the OTP is 18694283 (if arranged clockwise from the upper left) and the alteration code is 3-2-4-15-13-2-1-16. In this arrangement, indicator arrow 72 number one points towards the top-left digit, 1, of OTP 68 on display 50. Similarly, indicator arrow 72 number two points towards the top-right digit, 6, of OTP 68 on display 50. Indicator arrow 72 number three points towards the top-center digit, 8, of OTP 68 on display 50. Indicator arrow 72 number four points towards the bottom-center digit, 2, of OTP 68 on display 50. Indicator arrow 72 number five points towards the bottom-left digit, 8, of OTP 68 on display 50. Indicator arrow 72 number six points towards the middle-right digit, 9, of OTP 68 on display 50. Indicator arrow 72 number seven points towards the bottom-right digit, 4, of OTP 68 on display 50. Indicator arrow 72 number eight points towards the middle-left digit, 3, of OTP 68 on display 50. Thus, taken together, the set of aligned numbers 70 indicates a pattern of indicator arrows 72 that indicates that the altered OTP is 16828943.

Figure 5A:
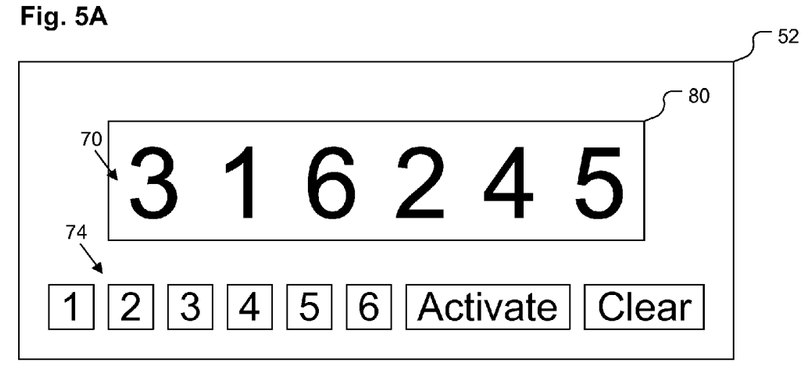
FIG. 5A is a block diagram depicting an example ancillary overlay device according to various embodiments.
Figure 5B:
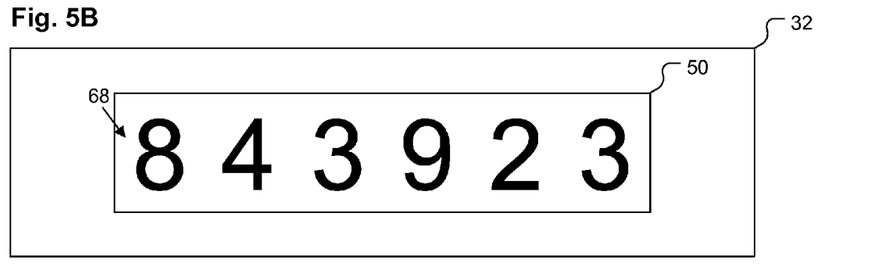
Figure 5C:
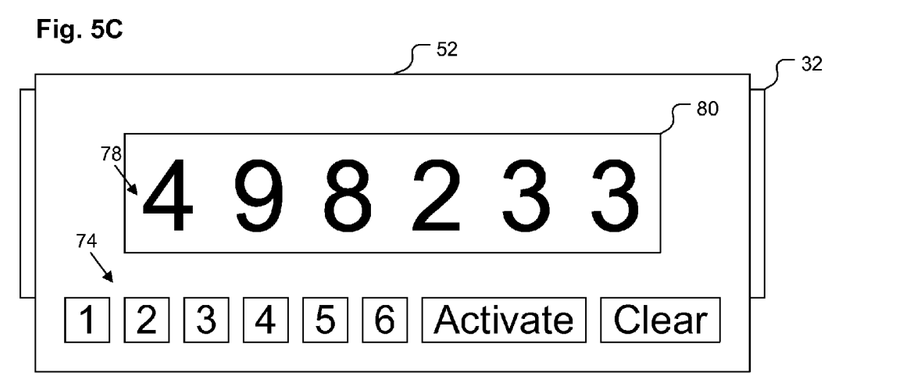
FIG. 5C is a block diagram depicting an example token device used in conjunction with an example ancillary overlay device according to various embodiments.

FIGS. 5A-5C depicts another example embodiment of the improved token 32 and alteration input apparatus 52. In this embodiment, alteration input apparatus 52 may be separate from improved token 32.

FIG. 5A depicts an example alteration input apparatus 52 according to this embodiment. As depicted, alteration input apparatus 52 includes a display 80 and a set of input keys 74. Display 80 is configured to display information to user 34. Display 80 may use any kind of display technology known now or in the future. Typically, however, display 80 is a low-voltage liquid crystal display configured to display a series of base-10 digits. For example, display 80 may be a rectangular liquid crystal display configured to display 6 digits or 8 characters in a linear pattern. As depicted, display 80 displays six digits of a set of aligned numbers 70 making up the alteration code. The user 34 is able to sequentially type in the digits of the alteration code using the input keys 74. For example, as depicted, the user 34 may have typed in 3 followed by 1 followed by 6 followed by 2 followed by 4 followed by 5. Thus, the alteration code 316245 appears as the set of aligned numbers 70 on display 80. In this embodiment, alteration apparatus 52 also includes a scanning element on its reverse side, not depicted. Also not depicted, alteration apparatus 52 includes a processor and memory similar to processor 54 and memory 56.

FIG. 5B depicts an example improved token 32 according to this embodiment. As depicted, display 50 displays OTP 68.

FIG. 5C depicts an arrangement in which the alteration apparatus 52 is laid on top of improved token 32. In this arrangement, the scanner on the reverse of the alteration apparatus 52 is positioned directly over display 50, allowing the alteration apparatus 52 to gain knowledge, as it were, of the OTP 68. The alteration apparatus 52 is then able to, upon the user pressing the "Activate" key, calculate the altered OTP 78 by applying the alteration code to the OTP 68 as described above in connection with FIG. 3, and display the altered OTP 78 on display 80. In some embodiments, another standardized technique for applying the alteration code to the OTP 68 may be used instead (e.g., one in which the application of the alteration code is cryptographically obscured).

Figure 6:
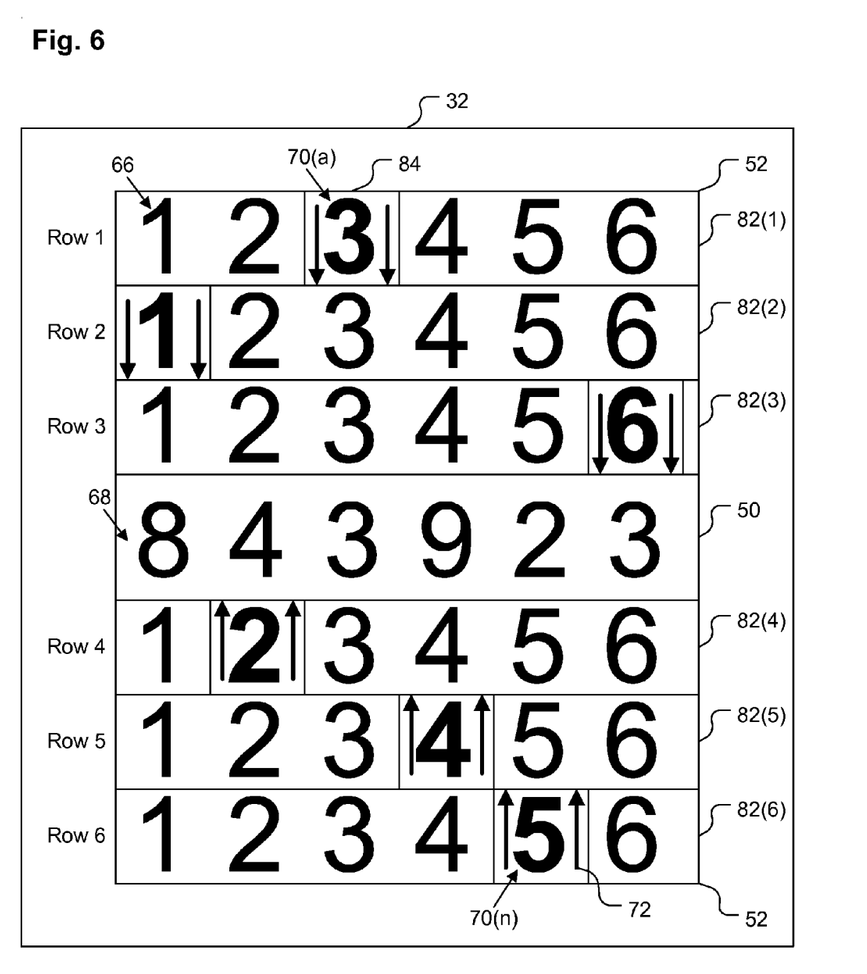

FIG. 6 depicts an example improved token 32 according to another particular embodiment. In this embodiment, alteration input apparatus 52 contains a set of slidable row sliders 84 which surround display 50. Each row slider 84(x) is configured to slide along a respective row 82(x) of a set of rows 82. Each row 82 has numerals 66 imprinted thereon. As depicted, the numerals 66 on each row are arranged as the consecutive integers from 1 to 6. More generally, the numerals 66 imprinted on each row will vary consecutively from 1 through the number of digits in OTP 68. As depicted, display 50 displays the six digits of OTP 68.

Each row slider 84 also has an indicator arrow 72 imprinted thereon. The indicator arrow 72 on each row slider 84(x) is adjacent to a selected number 70(x) that indicates what digit of OTP 68 should be selected as part of altered OTP in position x. As depicted, the row slider 84 over the first row 82(1) has its indicator arrow 72 adjacent to the numeral three, pointing to the third digit, 3, of OTP 68. Similarly, the row slider 84 over the second row 82(2) has its indicator arrow 72 adjacent to the numeral one, pointing to the first digit, 8, of OTP 68. The row slider 84 over the third row 82(3) has its indicator arrow 72 adjacent to the numeral six, pointing to the sixth digit, 3, of OTP 68. The row slider 84 over the fourth row 82(4) has its indicator arrow 72 adjacent to the numeral two, pointing to the second digit, 4, of OTP 68. The row slider 84 over the fifth row 82(5) has its indicator arrow 72 adjacent to the numeral four, pointing to the fourth digit, 9, of OTP 68. The row slider 84 over the sixth row 82(6) has its indicator arrow 72 adjacent to the numeral five, pointing to the fifth digit, 2, of OTP 68. Thus, taken together, the set of aligned numbers 70 indicates that the altered OTP is 383492.

Figure 7A:
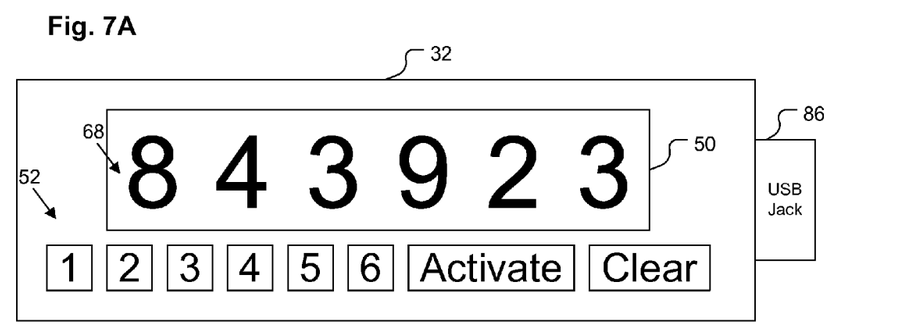
Figure 7B:
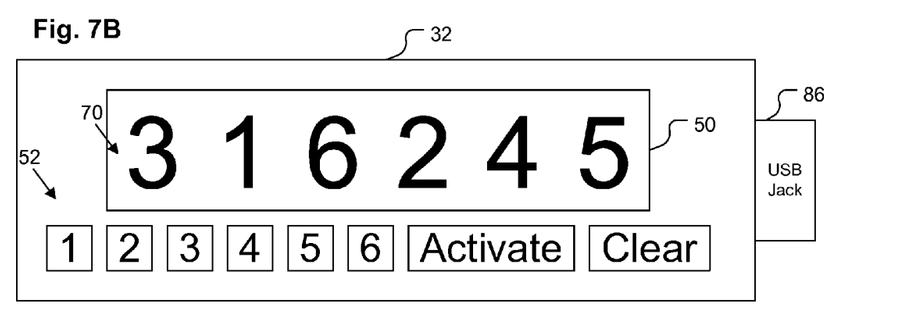
Figure 7C:
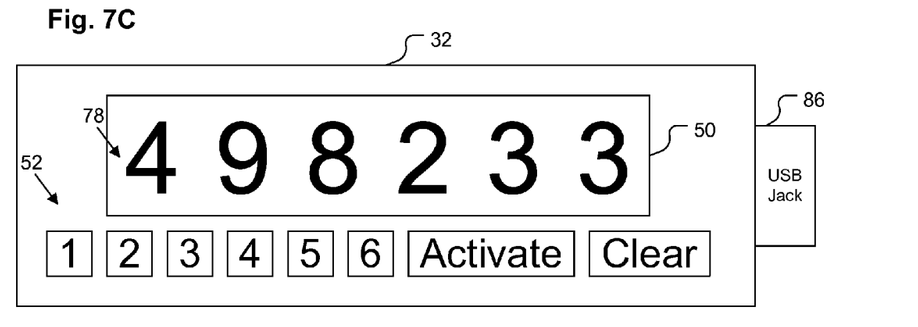

FIGS. 7A-7C depicts another example embodiment of the improved token 32. In this embodiment, improved token 32 includes a display 50 and alteration input apparatus 52 includes a set of input keys, similar to input keys 74 from FIG. 5A. Improved token 32 also includes a device interface 86, depicted as a USB jack, for interfacing with a computer, e.g., client computer 36.

In FIG. 7A, display 50 initially displays an OTP 68. In FIG. 7B, user 34 has entered alteration code into improved token 32 by pressing keys (e.g., keys 3, 1, 6, 2, 4, and 5) of the alteration input apparatus 52 thereby displaying the alteration code 316245 as the set of aligned numbers 70 on display 50.

In FIG. 7C, user 34 has pressed the "activate" key, causing the improved token 32 to calculate the altered OTP 78 by applying the alteration code to the OTP 68 as described above in connection with FIG. 3, and display the altered OTP 78 on display 50. In some embodiments, another standardized technique for applying the alteration code to the OTP 68 may be used instead (e.g., one in which the application of the alteration code is cryptographically obscured). Also, upon pressing the "Activate" key, the altered OTP 78 is sent via the device interface 86 to the connected client computer 36

Figure 8:
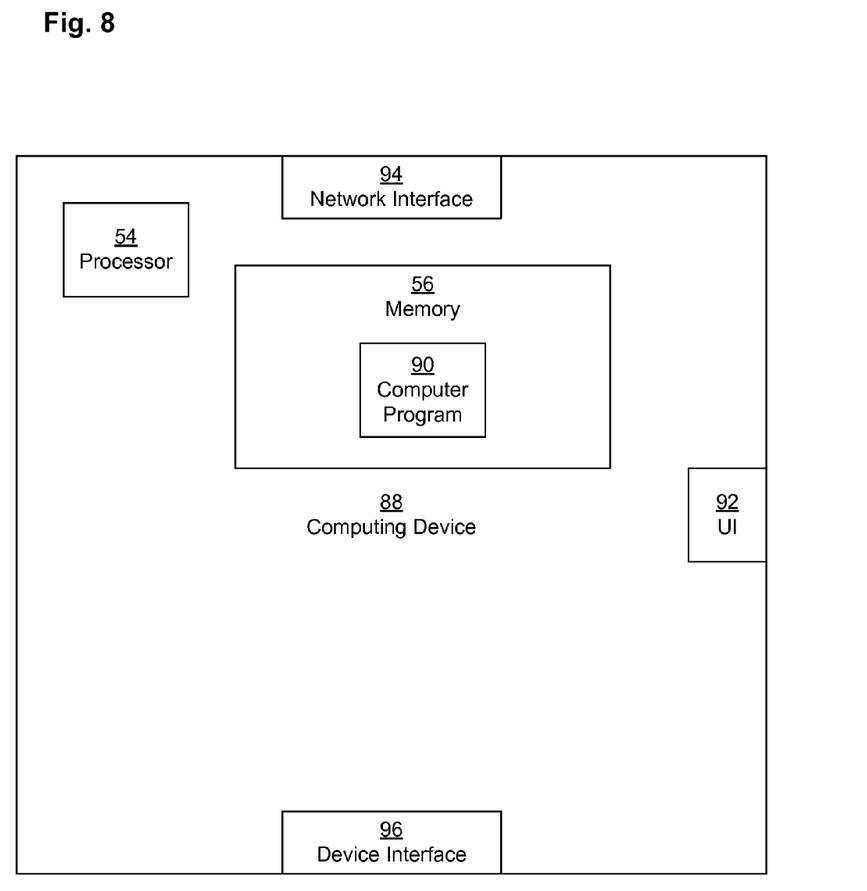
FIG. 8 is a block diagram depicting an example computing device that may be included within the example environment of FIG. 1.

FIG. 8 depicts an example computing device 88 that may be used to implement any of the client computer 36, authentication agent 40, alteration server 42, and authentication server 44. It should be understood that such computing devices 88 need not be identical to one another, however. Computing device 88 may be any kind of computing device, such as, for example, a personal computer, a workstation, a server, an enterprise server, a laptop computer, a mobile computer, a smart phone, a tablet computer, etc.

Computing device 88 includes a network interface 94. Some computing devices 88 are able to communicate with various other computing devices 88 (as relevant for the needs of that particular computing device 88) using network interface 94. In some embodiments (particularly in the case of client computer 36, but also, in certain embodiments, the other devices), computing device 88 also contains a user interface (UI) 92 which allows computing device 88 to communicate with a user 34 via UI devices (not depicted). UI 92 may be for example, one or more of the following, a graphics adapter, a serial port, a parallel port, a Universal Serial Bus adapter, etc. UI devices may include input devices as well as output devices. Example UI devices include a display monitor and a keyboard. Other example UI devices could include a printer, a touch screen, a mouse, etc. In some embodiments (particularly in the case of client computer 36, but also, in certain embodiments, the other devices), computing device 88 also contains a device interface 96 (e.g., a USB port) which allows computing device 88 to communicate with a an external device. For example, the device interface 96 of the client computer 36 may connect to the device interface 86 of improved token 32, allowing for USB communication between the improved token 32 and the client computer 36.

Computing device 88 also contains a processor 54 and memory 56. Processor 54 may be any kind of processor or set of processors configured to perform operations, such as, for example, a microprocessor, a multi-core microprocessor, a digital signal processor, a collection of electronic circuits, or any combination of the above. Memory 56 may be any kind of digital memory, such as, for example, random access memory, read-only memory, static memory, volatile memory, non-volatile memory, system memory, solid-state storage, disk-based storage, or some combination of the above. Memory 56 stores programs executing on processor 54 as well as data used by those programs. Memory 56 stores an operating system (not depicted) and a computer program 90, both of which run on processor 56. Memory 56 typically includes both a system memory portion for storing programs and data in active use by the processor 54 as well as a persistent storage portion (e.g., solid-state storage and/or disk-based storage) for storing programs and data even while the computing device 88 is powered off. OS and computer program 90 are typically stored both in system memory and in persistent storage so that they may be loaded into system memory from persistent storage upon a system restart. The computer program 90, when stored in non-transient form in system memory or in persistent storage, forms a computer program product. Memory 56 also stores data which is used by computer program 90 in operation. The processor 54 running the computer program 90 thus forms a specialized circuit constructed and arranged to carry out the various processes described herein.

On a client computer 36, computer program 90 may be an authentication client program. In the case of authentication agent 40, computer program 90 may itself be authentication agent 40. On alteration server 42, computer program 90 may be an alteration code assignment program. On authentication server 44, computer program 90 may be an authentication server program.

Figure 9:
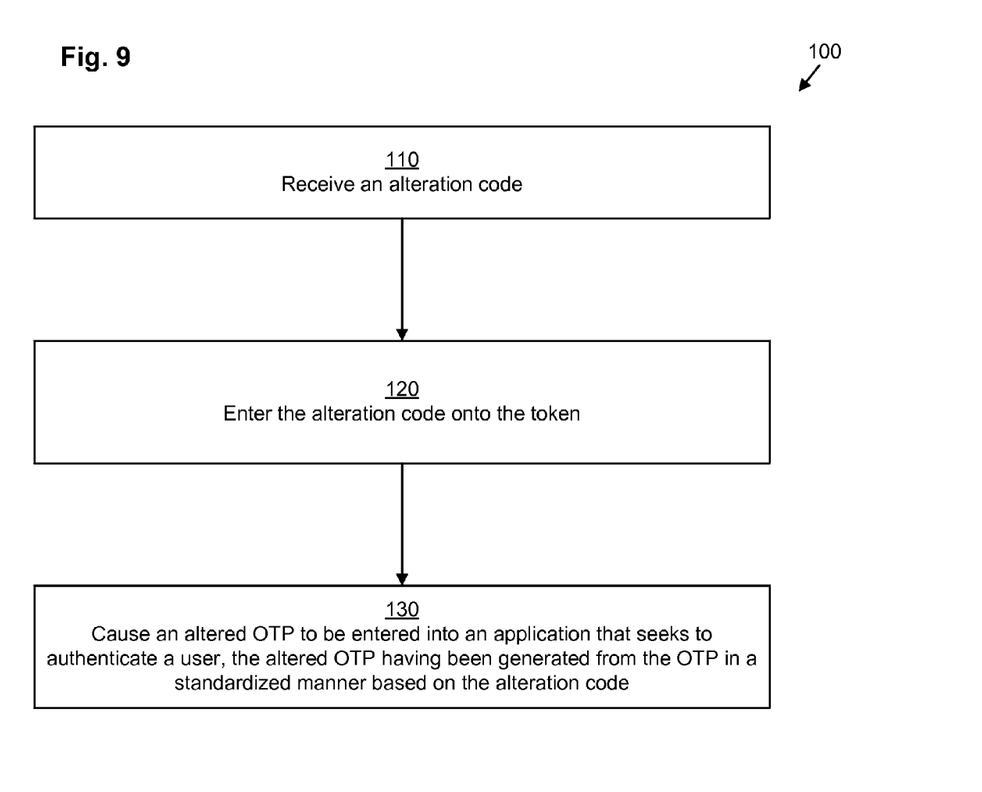
FIG. 9 is a flow chart depicting an example method according to various embodiments.
Figure 10:
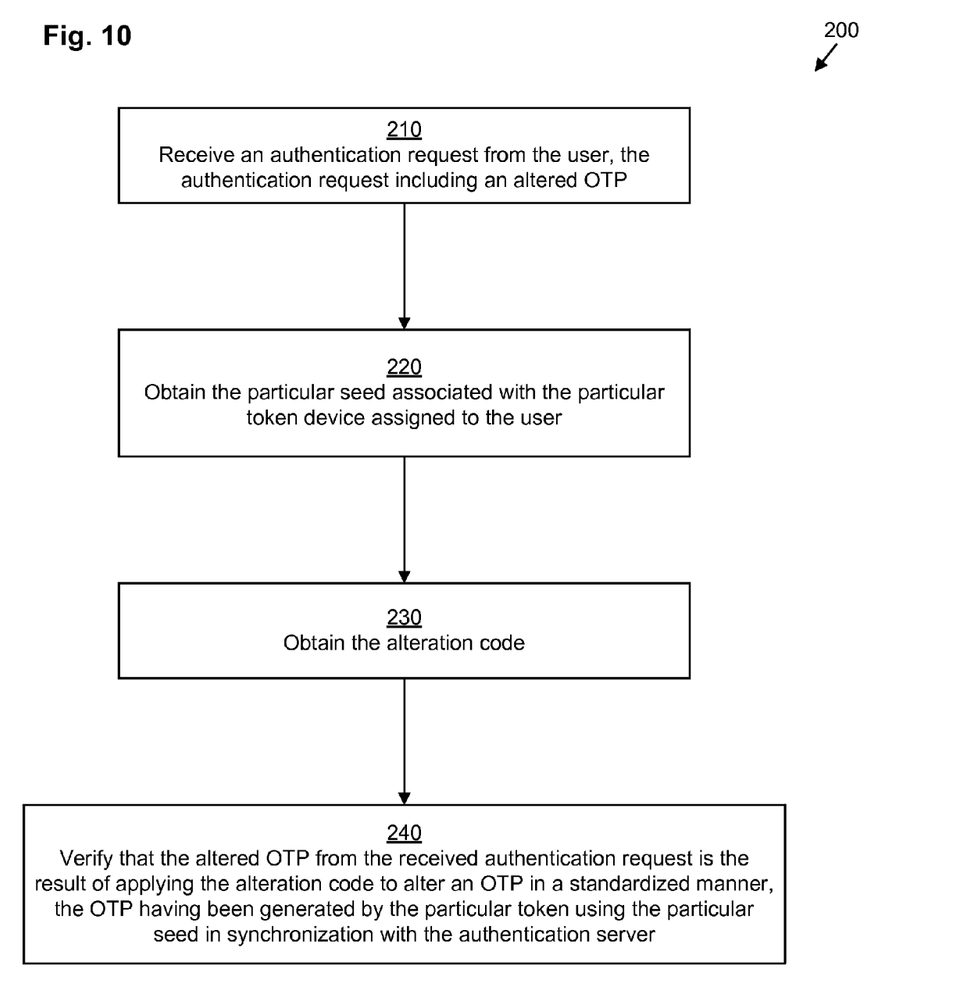
FIG. 10 is a flow chart depicting another example method according to various embodiments.

FIGS. 9-10 illustrate example operation of environment 30 in detail according to various embodiments. It should be understood that any time a piece of software, such as, for example, computer program 90, is described as performing a method, process, step, or function, what is meant is that the computing device 88 on which that piece of software is running performs the method, process, step, or function when executing that piece of software on processor 54.

FIG. 9 illustrates, as method 100, the operation of improved token 32 and client computer 36 by the user 34. In step 110, the user 34 receives the alteration code from the alteration server 42. Typically, the user 34 attempts to log into a remote resource across the network 38 via authentication agent 40, by running authentication client program on client computer 36. Upon doing so, authentication agent 40 may inform alteration server 42 to send the alteration code to the client computer 36. Alternatively, user 34 or authentication client program may directly request the alteration code from the alteration server 42.

In step 120, the user 34 enters the alteration code into the alteration input apparatus 52 associated with the improved token 32. This may be accomplished within the context of any of the improved tokens 32 with mounted or separate alteration input apparatuses 52 described in FIGS. 3-7.

In step 130, the user 34 causes an altered OTP 78 to be entered into the authentication client program running on client computer 36 to allow the authentication client program to authenticate to the authentication agent 40. In the embodiments of FIGS. 3, 4, and 6, the user 34 manually converts the OTP 68 displayed on display 50 into the altered OTP 78 by applying the alteration code in a standardized manner as described in the context of each of those embodiments, and the user 34 manually enters the altered OTP into the client computer 36 via the UI 92. In the embodiments of FIGS. 5A-5C, the alteration input apparatus 52 converts the OTP 68 displayed on display 50 into the altered OTP 78 displayed on display 80 by applying the alteration code as described in the context of FIGS. 5A-5C in a standardized manner, and the user 34 copies the displayed altered OTP 78 into the client computer 36 via the UI 92.

In the embodiments of FIGS. 7A-7C, the improved token 32 converts the OTP 68 displayed on display 50 into the altered OTP 78 displayed on display 50 by applying the alteration code as described in the context of FIGS. 7A-7C in a standardized manner. In some of these embodiments, the user 34 copies the displayed altered OTP 78 into the client computer 36 via the UI 92, while in others, the user 34 connects the device interface 86 of the improved token 32 to the device interface 96 of the client computer 36, allowing the altered OTP 78 to be automatically transferred to the authentication client program running on the client computer 36 via USB.

FIG. 10 illustrates, as method 200, the operation of authentication system 31. In step 210, authentication agent 40 receives an authentication request from the user 34 (e.g., via authentication client program running on client computer 36). The authentication request includes an altered OTP 78.

In step 220, authentication agent 40 obtains the particular seed 58 associated with the particular improved token 32 assigned to the user 34. If the authentication agent 40 runs on the authentication server 44, then the authentication agent 40 may accomplish this task by directly looking up the correct seed 58 in user-seed table 46. If the authentication agent 40 is external to the authentication server 44, authentication agent 40 accomplishes this task by communicating with external authentication server 44, which is able to look up the correct seed 58 in its user-seed table 46. In some embodiments, instead of the authentication server 44 sending the seed 58 to the authentication agent, the authentication server 44 calculates the OTP 68 and sends the current OTP 68 to the authentication agent 40.

In step 230, authentication agent 40 obtains the alteration code which the alteration server 42 sent to the client computer 36. If the authentication agent 40 runs on the alteration server 42, then the authentication agent 40 may accomplish this task by directly looking up the alteration code which was sent. If the authentication agent 40 is external to the alteration server 42, authentication agent 40 accomplishes this task by communicating with external alteration server 42, which is able to look up alteration code which was sent.

In step 240, the authentication agent 40 verifies that the altered OTP 78 received within the authentication request is the result of applying the alteration code to the OTP 68 in a standardized manner, thereby verifying that the user 34 is in possession of the improved token 32. In some embodiments (see, e.g., FIGS. 4, 5A-5C, and 7A-7C), further security may be provided if the result of applying the alteration code to the OTP 68 in a standardized manner is not knowable by an entity not in possession of the improved token 32 with the alteration input apparatus 52 or otherwise aware of the configuration of such devices.

Thus, techniques have been described for providing temporary alteration codes to users 34 at authentication time which can be used to obscure OTPs 68 provided by tokens 32.

While various embodiments of the present disclosure have been particularly shown and described, it will be understood by those skilled in the art that various changes in form and details may be made therein without departing from the spirit and scope of the present disclosure as defined by the appended claims.

For example, it should be understood that, although various embodiments have been described as being methods, software embodying these methods is also included. Thus, one embodiment includes a tangible non-transient computer-readable medium (such as, for example, a hard disk, a floppy disk, an optical disk, computer memory, flash memory, etc.) programmed with instructions, which, when performed by a computer or a set of computers, cause one or more of the methods described in various embodiments to be performed. Another embodiment includes a computer which is programmed to perform one or more of the methods described in various embodiments.

Furthermore, it should be understood that all embodiments which have been described may be combined in all possible combinations with each other, except to the extent that such combinations have been explicitly excluded.

Finally, nothing in this Specification shall be construed as an admission of any sort. Even if a technique, method, apparatus, or other concept is specifically labeled as "prior art" or as "conventional," Applicants make no admission that such technique, method, apparatus, or other concept is actually prior art under 35 U.S.C. §102, such determination being a legal determination that depends upon many factors, not all of which are known to Applicants at this time.

What is claimed is:

1. A token apparatus comprising:
   a controller, the controller being configured to generate a one-time passcode (OTP) in synchronization with a remote authentication server;
   a display, the display being constructed and arranged to display the OTP;
   an input apparatus, the input apparatus being constructed and arranged to receive a user-input alteration code, the user-input alteration code being used to alter the OTP in a standardized manner.

2. The token apparatus of claim 1, wherein:
   the input apparatus is a set of rotatable rings, each rotatable ring of the set of rotatable rings having a set of numbers imprinted thereon such that a user is able to enter the user-input alteration code by rotating the rotatable rings with reference to the imprinted numbers; and
   once the user has entered the user-input alteration code, an orientation of the rings depicts a pattern according to which the user is able to alter the OTP in the standardized manner.

3. The token apparatus of claim 2, wherein:
   the display is constructed and arranged to display n digits from left to right in a display direction, n being equal to a number of digits in the OTP, n also being equal to a number of digits in the alteration code;
   the display direction of the OTP on the display is parallel to an axis of rotation, each rotatable ring being configured to rotate around the axis of rotation;
   each rotatable ring is aligned with a different digit of the display; and
   the set of numbers imprinted on each adjustable ring is a consecutive set of integers from 1 to n.

4. The token apparatus of claim 2, wherein:
   the display has a square shape, being constructed and arranged to display 8 digits around its perimeter, the OTP having 8 digits and the alteration code also having 8 digits, the set of rotatable rings including 8 rotatable rings, the rotatable rings being indexed by integers from 1 to 8;
   each rotatable ring is configured to rotate around the square display;
   each rotatable ring includes an indicator arrow imprinted thereon adjacent to the index integer of that ring, such that, when the user aligns a number imprinted on that rotatable ring with an alignment standard, the indicator arrow of that ring points toward a particular digit of the display; and once the user has entered the user-input alteration code, the user is able to alter the OTP in the standardized manner by reading the digits of the OTP depicted in the display in an order defined by the indicator arrows of the rotatable rings in index order.

5. The token apparatus of claim 1, wherein the input apparatus is an ancillary overlay device having an ancillary screen, a set of input keys, and a scanning device, such that:

the user is able to enter the alteration code using the set of input keys;

upon the alteration code being entered and the ancillary overlay device being placed directly over the token apparatus, the ancillary overlay device is constructed and arranged to:

scan the OTP displayed on the display;

alter the scanned OTP according to the alteration code entered by the user, thereby generating an altered OTP; and display the altered OTP on the ancillary display.

6. The token apparatus of claim 1, wherein:

the input apparatus is a set of row sliders, each row slider of the set of row sliders having a set of numbers imprinted therebelow such that a user is able to enter the user-input alteration code by sliding the row sliders with reference to the imprinted numbers; and once the user has entered the user-input alteration code, an orientation of the set of row sliders depicts a pattern according to which the user is able to alter the OTP in the standardized manner.

7. The token apparatus of claim 1, wherein:

the input apparatus includes a set of input keys such that the user is able to enter the alteration code using the set of input keys; and the controller is configured to, upon the user inputting the alteration code using the set of input keys:

alter the OTP according to the alteration code entered by the user, thereby generating an altered OTP; and display the altered OTP on the display.

8. The token apparatus of claim 1, wherein:

the input apparatus includes a set of input keys such that the user is able to enter the alteration code using the set of input keys;

the token apparatus further includes a device interface for interfacing with a computer, the computer being configured to run an authentication program for authenticating the user; and the controller is configured to, upon the user inputting the alteration code using the set of input keys:

alter the OTP according to the alteration code entered by the user, thereby generating an altered OTP; and send the altered OTP to the computer via the device interface for authentication.

9. A method of operating a token device, the token device displaying a one-time passcode (OTP) in synchronization with a remote authentication server, the method comprising:

receiving an alteration code;

entering the alteration code onto the token device;

causing an altered OTP to be entered into an application that seeks to authenticate a user, the altered OTP having been generated from the OTP in a standardized manner based on the alteration code.

10. The method of claim 9, wherein receiving the alteration code includes receiving the alteration code from an alteration server distinct from the authentication server.

11. The method of claim 9, wherein the OTP has exactly n digits and the alteration code has exactly n digits, each digit of the alteration code being selected from the integers from 1 to n, each digit of the alteration code being distinct from every other digit of the alteration code.

12. The method of claim 9, wherein:

entering the alteration code onto the token device includes rotating a set of rotatable rings mounted on the token device, each rotatable ring of the set of rotatable rings having a set of numbers imprinted thereon such that a user is able to enter the alteration code by rotating the rotatable rings with reference to the imprinted numbers;

causing the altered OTP to be entered into the application includes typing digits of the displayed OTP into the application in an order indicated by a set of order indicators on the set of rotatable rings as rotated according to the alteration code.

13. The method of claim 9, wherein:

entering the alteration code onto the token device includes sliding a set of sliders mounted, respectively, on a set of rows mounted on the token device, each row of the set of rows having a set of numbers imprinted thereon such that a user is able to enter the alteration code by sliding the sliders with reference to the imprinted numbers;

causing the altered OTP to be entered into the application includes typing digits of the displayed OTP into the application in an order indicated by a relative position of the sliders of the set of sliders as slid according to the alteration code.

14. The method of claim 9 wherein:

entering the alteration code onto the token device includes typing the alteration code using a set of input keys mounted on the token device; and causing the altered OTP to be entered into the application includes sending, via a device interface mounted on the token device, the altered OTP to a computer configured to run the application for authenticating the user, wherein the altered OTP is generated by the token device by applying the alteration code to the OTP according to a standardized algorithm.

15. The method of claim 9, wherein the method further includes, entering a secret personal code onto the token by typing the secret personal code using a set of input keys mounted on the token device, the token displaying the OTP upon receiving an expected secret personal code.

16. An authentication system, comprising:

an authentication server, the authentication server storing a set of secret seeds, each secret seed being associated with a distinct token device;

an authentication agent for authenticating an identity of a user assigned to possess a particular token device having a particular secret seed; and an alteration server, separate from the authentication server, the alteration server being configured to generate an alteration code for a particular authentication transaction;

wherein the authentication agent is configured to:

receive an authentication request from the user, the authentication request including an altered one-time passcode (OTP);

obtain the particular seed associated with the particular token device assigned to the user;

obtain the alteration code for the particular authentication transaction involving the received authentication request;

verify that the altered OTP from the received authentication request is the result of applying the alteration code to alter an OTP in a standardized manner, the OTP having been generated by the particular token device using the particular seed in synchronization with the authentication server.

17. The authentication system of claim 16, wherein:

the authentication agent is separate from the authentication server;

the authentication agent is separate from the alteration server;

the authentication agent is configured to obtain the particular seed associated with the particular token device assigned to the user by:

sending a seed request to the authentication server, the seed request indicating the user; and receiving the particular seed associated with the particular token device assigned to the user from the authentication server in response to the seed request; and the authentication agent is configured to obtain the alteration code for the particular authentication transaction involving the received authentication request by:

sending an alteration code request to the alteration server, the alteration code request identifying the particular authentication transaction using the received authentication request; and receiving the alteration code in response to the alteration code request.

18. The authentication system of claim 16, wherein:

the authentication agent and the alteration server run on a single machine, separate from the authentication server; and the authentication agent is configured to obtain the particular seed associated with the particular token device assigned to the user by:

sending a seed request to the authentication server, the seed request indicating the user; and receiving the particular seed associated with the particular token device assigned to the user from the authentication server in response to the seed request.

19. The authentication system of claim 16, wherein:

the authentication agent and the authentication server run on a single machine, separate from the alteration server; and the authentication agent is configured to obtain the alteration code for the particular authentication transaction involving the received authentication request by:

sending an alteration code request to the alteration server, the alteration code request identifying the particular authentication transaction using the received authentication request; and receiving the alteration code in response to the alteration code request.

20. The token apparatus of claim 1, wherein the input apparatus includes a set of adjustable elements having a set of numbers imprinted in connection therewith such that a user is able to enter the user-input alteration code by adjusting the adjustable elements with reference to the imprinted numbers.

21. The token apparatus of claim 1, wherein the input apparatus includes a set of input keys such that the user is able to enter the user-input alteration code using the set of input keys.

22. The token apparatus of claim 1, wherein the user-input alteration code was generated by a remote alteration server, separate from the remote authentication server.

23. The token apparatus of claim 1, wherein the OTP has exactly n digits and the user-input alteration code has exactly n digits, each digit of the user-input alteration code being selected from the integers from 1 to n, each digit of the user-input alteration code being distinct from every other digit of the user-input alteration code.

24. The method of claim 9, wherein entering the alteration code onto the token device includes adjusting a set of adjustable elements mounted on the token device, each adjustable element having a set of numbers imprinted in connection therewith such that the user is able to enter the user-input alteration code by adjusting the adjustable elements with reference to the imprinted numbers.

25. The method of claim 9, wherein receiving the alteration code includes receiving the alteration code from a remote alteration server, separate from the remote authentication server.

* * * * *